United States Patent [19]

Caropreso et al.

[11] 4,024,215
[45] May 17, 1977

[54] PRODUCTION OF URANIUM PEROXIDE

[75] Inventors: Frank E. Caropreso, Hightstown; Donald F. Kreuz, Princeton Junction, both of N.J.

[73] Assignee: FMC Corporation, Philadelphia, Pa.

[22] Filed: Apr. 24, 1975

[21] Appl. No.: 571,089

[52] U.S. Cl. .................................. 423/16; 423/260
[51] Int. Cl.$^2$ ....................................... C01G 43/00
[58] Field of Search ............................ 423/16, 260

[56] References Cited

UNITED STATES PATENTS

| | | | |
|---|---|---|---|
| 2,723,181 | 11/1955 | Larson | 423/260 |
| 2,855,270 | 10/1958 | Carter et al. | 423/16 |

FOREIGN PATENTS OR APPLICATIONS

| | | | |
|---|---|---|---|
| 696,022 | 8/1953 | United Kingdom | 423/16 |

OTHER PUBLICATIONS

Caropreso et al., *Trans. Soc. Mining Eng. AIME,* 254 (4), 281–284, (1973).
Shabbir et al., *U.S. Bur. Mines Rep. Invest.,* RI 7931, 13 pp. (1974).

*Primary Examiner*—Edward A. Miller
*Attorney, Agent, or Firm*—Robert D. Jackson; Frank Ianno

[57] ABSTRACT

A process of recovering uranium values as uranium peroxide from an aqueous uranyl solution containing dissolved vanadium and sodium impurities by treating the uranyl solution with hydrogen peroxide in an amount sufficient to have an excess of at least 0.5 parts $H_2O_2$ per part of vanadium ($V_2O_5$) above the stoichiometric amount required to form the uranium peroxide, the hydrogen peroxide treatment being carried out in three sequential phases consisting of I, a precipitation phase in which the hydrogen peroxide is added to the uranyl solution to precipitate the uranium peroxide and the pH of the reaction medium maintained in the range of 2.5 to 5.5 for a period of from about 1 to 60 minutes after the hydrogen peroxide addition; II, a digestion phase in which the pH of the reaction medium is maintained in the range of 3.0 to 7.0 for a period of about 5 to 180 minutes and III, a final phase in which the pH of the reaction medium is maintained in the range of 4.0 to 7.0 for a period of about 1 to 60 minutes during which time the uranium peroxide is separated from the reaction solution containing the dissolved vanadium and sodium impurities. The excess hydrogen peroxide is maintained during the entire treatment up until the uranium peroxide is separated from the reaction medium.

3 Claims, No Drawings

PRODUCTION OF URANIUM PEROXIDE

This invention relates to the recovery of uranium values from uranyl solutions, and more particularly to the recovery of such uranium values as purified uranium peroxide.

In the refining of uranium from its ores, crushed uranium minerals are leached with acid or alkali and the resulting leach liquor upgraded to give a concentrated uranium solution from which the solid uranium values are recovered. Sulfuric acid and sodium carbonate are the two commonly used leaching agents. In the case of alkaline leaching with sodium carbonate, the clarified, leach liquor containing soluble complex uranium compounds such as $Na_4UO_2(CO_3)_3$ is reacted with sodium hydroxide to precipitate the uranium as sodium diuranate ($Na_2U_2O_7$) or "yellowcake". In the case of acid leaching, the acid leach liquor in which the uranium is in the form of uranyl ions, $UO_2^{++}$, is subjected to solvent extraction or treatment with ion exchange resins to remove the uranium values which are then eluted from the resin or stripped from the solvent thereby producing a concentrated uranyl solution. For a fuller account on the chemistry and refining of uranium, reference is made to the review article entitled "Uranium and Uranium Compounds" in Kirk-Othmer Encyclopedia of Chemical Technology, 2nd Ed., Vol. 21, pages 1 – 35.

Although generally satisfactory, the aforedisclosed prior art techniques for uranium refining may yield uranium concentrates containing impurities which are difficult to remove. Yet product purity is important because the processors of such concentrates to uranium hexafluoride assess price penalties in proportion to the level of impurities.

An especially intractable contaminant in uranium concentrates is the element vanadium, commonly found in association with uranium ores. Although pulping or digesting the yellowcake with aqueous ammonium sulfate extracts vanadium values, the treatment is tedious and time consuming and is a generally impractical approach for realizing high purity. Another expedient for dealing with vanadium contamination consists in roasting the crude yellowcake followed by leaching out the resulting sodium vanadate. Such pretreatment is costly and further complicates the refining process.

Moreover, before uranium concentrates can be processed to uranium hexafluoride, they must be low in sodium to avoid extreme reaction conditions which can cause difficulties with sintering and fusion.

It has been proposed to upgrade uranium concentrates by treating uranyl solutions with hydrogen peroxide whereby the uranium values are precipitated as highly insoluble uranium peroxide. The reaction, which is well known, can be represented by the following equation:

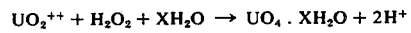

$$UO_2^{++} + H_2O_2 + XH_2O \rightarrow UO_4 \cdot XH_2O + 2H^+$$

wherein X is most commonly 2.
Uranium peroxide is reported to be the least soluble of uranium compounds and its precipitation from uranyl solutions is essentially quantitative, having even been used for the analytical determination of uranium.

Uranium peroxide precipitation has been tried extensively as a means of recovering uranium values from impure uranyl solutions derived from numerous sources including uranium leach liquors and liquor concentrates. Generally speaking, the technique is simple to carry out and leads to a high quality product.

Uranium peroxide precipitation has not been completely satisfactory in producing a high quality product from solutions containing large amounts of vanadium. As previously pointed out herein, vanadium often occurs in association with uranium ores. Unless removed by a roasting pretreatment or post extraction of the yellowcake, it appears as an impurity in the final uranium concentrate. Uranyl solutions, whether produced by solvent extraction or ion exchange of acid leach liquors or by acid dissolution of yellowcake ($Na_2U_2O_7$) will contain both sodium and vanadium plus other ionic species such as $Cl^-$, $NO_3^-$, $SO_4^{--}$ and the like. When such uranyl solutions are treated with hydrogen peroxide, the resulting uranium peroxide contains sodium and vanadium, both of which may be in concentrations above specification limits imposed by processors of $U_3O_8$ for isotope enrichment.

Partial success in reducing the sodium and vanadium content of uranium peroxide prepared by adding hydrogen peroxide to a uranyl solution containing these impurities is reported by F. E. Caropreso et al in Transaction of the Society of Mining Engineers, AIME, Vol. 254, Pages 281–284, (1973). According to this publication, the initial pH of the uranyl solutions was 2.0 while the precipitation and digestion of uranium peroxide was carried out at a pH of 3.4 in the presence of excess hydrogen peroxide. Where such uranyl solutions contained up to 0.5 g/l $V_2O_5$, the uranium peroxide product assayed less than 0.1% $V_2O_5$. When the $V_2O_5$ content of the solution was 1 g/l or more, the $V_2O_5$ in the product was about 0.4%. Although Caropreso et al recognized that pH and excess hydrogen peroxide influence the amount of vanadium and sodium coprecipitated with uranium peroxide, such recognition did not lead to a generally satisfactory and reliable process of recovering uranium values as uranium peroxide from uranyl solutions containing high concentrations of vanadium and sodium.

It has now been discovered that uranium values can be recovered as uranium peroxide from an aqueous uranyl solution containing dissolved vanadium and sodium impurities, comprising treating the uranyl solution with hydrogen peroxide in an amount equal to at least 0.5 part $H_2O_2$ per part of vanadium ($V_2O_5$) in solution in excess of the stoichiometric (.126 parts/part $U_3O_8$) amount required to form the uranium peroxide, the hydrogen peroxide treatment being carried out in three sequential phases consisting of I, a precipitation phase in which the hydrogen peroxide is added to the uranyl solution to precipitate the uranium peroxide and the pH of the reaction media maintained in the range of 2.5 to 5.5 for a period of from about 1 to 60 minutes after the hydrogen peroxide addition; II, a digestion phase in which the pH of the reaction medium is maintained in the range of 3.0 to 7.0 for a period of about 5 to 180 minutes and III, a post digestion phase in which the pH of the reaction media is maintained in the range of 4.0 to 7.0 for a period of about 1 to 60 minutes during which time the uranium peroxide is separated from the reaction solution containing the dissolved vanadium and sodium impurities, it being understood that the excess hydrogen peroxide aforesaid is maintained until the uranium peroxide is recovered from the reaction medium.

The aqueous uranyl solutions, used in carrying out the invention, may be ion exchange or solvent extraction eluates or an acid solution of yellowcake, i.e. sodium diuranate. In either case, the product is an aqueous solution of uranyl ions, commonly uranyl sulfate or uranyl chloride, sodium and vanadium.

The $U_3O_8$ assay of the uranyl solution can vary from about 3 to 150 g/l, preferably less than 100 g/l. At the higher range, the uranium peroxide may be difficult to filter and wash and moreover precipitation tends to be incomplete.

Although any soluble uranyl salt is generally suitable, the sulfate ($SO_4^{-2}$), and chloride ($Cl^-$) have proved convenient and easy to work with. However, when sulfuric acid is used to form uranyl solutions from yellowcake, the sulfate concentration should not exceed 200 g/l lest it inhibit precipitation of the uranium. The preferred range of $SO_4^{-2}$ is held to below about 100 g/l.

So far as we can ascertain, the process herein is effective in recovering uranium values as uranium peroxide from any concentration of sodium and vanadium dissolved in the uranyl solution. Usually, these elements will range from about 5.0 to 60 g/l of sodium and from about 0.1 to 5.0 g/l of vanadium. Such concentrations in the uranyl solutions will be a function of the ore and the type of processing treatment. It is the singular capacity to effect clean separation of uranium values from even very high concentrations of sodium and vanadium whereby the present invention constitutes such a marked advance over the procedure disclosed in the aforecited publication to Caropreso et al.

The amount of hydrogen peroxide used must be in excess of the stoichiometric amount required to form uranium peroxide, i.e. 0.126 parts per part of the $U_3O_8$ assay of the uranyl solution. The quantity of excess hydrogen peroxide will depend on the vanadium content of the uranyl solution plus the presence of other oxidizable substances as well as the length of time the precipitate of uranium peroxide is digested prior to its recovery from the reaction mixture. In general, retaining an excess of hydrogen peroxide of at least 0.5 part/1 part of vanadium as $V_2O_5$ over the stoichiometric requirement of 0.126 part/1 part of $U_3O_8$ is sufficient to effect separation of the uranium peroxide from the vanadium and sodium impurities which remain in solution. If the minimal excess hydrogen peroxide is not maintained, vanadium values will coprecipitate with the uranium peroxide while $U_3O_8$ losses to the barrens may occur. The hydrogen peroxide is ascertained by monitoring the reaction mixture using a standard titration technique such as ceric sulfate and ferroin indicator.

The strength of the hydrogen peroxide is not critical but is conveniently employed as an aqueous solution, usually 50% $H_2O_2$ or less.

The pH conditions under which the process of the invention as performed must be carefully maintained and controlled in three consecutive phases identified as follows:

Phase I. This is the precipitation phase and is the interval commencing with addition of hydrogen peroxide up to about 60 minutes thereafter preferably 1 to 10 minutes thereafter. Subsequent to the addition of the hydrogen peroxide, the pH is maintained in the range 2.5 to 5.5, preferably 2.9 to 4.9 until Phase I is completed. The pH of Phase I is designated the precipitation pH or $pH_p$.

Initial pH ($pH_i$) of the uranyl solution prior to adding hydrogen peroxide is generally in the region of about 2 – 6. If the pH exceeds about 6, the solutions become unstable and uranium containing solids will form.

Phase II. This is the digestion phase and commences after completion of Phase I. During this phase, the pH is held within the range 3.0 – 7.0, preferably 3.5 – 6.0. The purpose of the digestion is to promote crystal growth of the uranium peroxide to facilitate separation thereof and to insure that precipitation is complete. The digestion phase is the period from about 5 – 180 minutes, preferably 5 – 60 minutes. The pH of Phase II is designated the digestion pH or $pH_d$.

Phase III. This is the post digestion phase and is the period during which the uranium peroxide solids are recovered from the mother liquor containing the dissolved impurities. The pH of the Phase III reaction mixture is maintained in the final range of 4.0 – 7.0, preferably 5.0 – 6.0 and assures final precipitation and conditioning of the solids. Phase III can encompass a period of about 1 – 60 minutes, preferably 1 – 15 minutes. The pH of Phase III is designated the post digestion or final pH or $pH_f$. The uranium peroxide can be recovered by the usual procedures familiar to the art such as filtration, decantation, centrifugation and the like.

In the following nonlimiting examples, proportions are by weight unless otherwise specified.

PREPARATION OF URANYL SOLUTIONS

A stock uranyl solution is prepared by dissolving sodium diuranate in sulfuric acid. The sodium diuranate is commercial yellowcake precipitated from an alkaline leach solution and assayed in the range of 7 – 10% sodium and 5 – 6% vanadium reported as % $V_2O_5$. The resulting solution of uranyl sulfate is adjusted to 70 g/l of $U_3O_8$; 10 – 17 g/l of sodium; 65 to 70 g/l of $SO_4^{-2}$ and 3.5 to 4.5 g/l of vanadium ($V_2O_5$).

PREPARATION OF URANIUM PEROXIDE

A 100 ml portion of the stock solution aforesaid is transferred to a reaction beaker and the temperature adjusted to 48° C and maintained using a constant temperature water bath. The solution pH is adjusted to the initial value ($pH_i$) with ammonium hydroxide and then hydrogen peroxide added in a single portion. The pH immediately following peroxide is adjusted to the precipitation pH ($pH_p$). Where the initial pH ($pH_i$) is on the high side, the increased acidity following hydrogen peroxide addition may lower the pH to the correct level for the precipitation pH ($pH_p$). If increased acidity is required, this can be effected by adding a suitable mineral acid, e.g. sulfuric or hydrochloric acid. If, on the other hand, $pH_i$ is on the low side, then the $pH_p$ will have to be raised by addition of aqueous ammonia. After mixing at $pH_p$ for the time specified the pH is adjusted to digestion pH ($pH_d$). Following digestion, the pH is once again adjusted, this time to the final pH ($pH_f$) and maintained for 15 minutes.

The slurry is next filtered using a Buchner funnel with a "fine" fritted disc. Filtration is carried out without any addition of water in order to obtain barrens which would be representative of a thickener overflow. These barrens are analyzed for $U_3O_8$ content to determine uranium recovery.

Residual peroxide is determined in the filtrate using the standard ceric sulfate titration with ferroin as indicator.

Washing is carried out by slurrying (repulping) the precipitate with a 0.2% solution of $H_2O_2$ and then filtering. This operation is repeated twice using a 25% slurry density.

The precipitate is dried at 150° C overnight and then analyzed.

Using the procedure aforesaid, several exemplary runs of uranium peroxide precipitation were carried out to illustrate the process of the invention. The results of these runs are summarized in Tables I – VI in which $pH_i$ is initial pH; $pH_p$ is precipitation pH; $pH_d$ is digestion pH and $pH_f$ is final pH.

Table I shows the need for recovering the uranium peroxide under conditions whereby residual hydrogen peroxide is maintained at a concentration of at least 0.5 parts per 1 part of $V_2O_5$, in excess of the stoichiometric quantity needed to form the uranium peroxide. Runs – 3 were performed at less than the requisite excess of hydrogen peroxide and gave a product high in $V_2O_5$ assay. Runs 4 and 5 were performed with at least the requisite excess of hydrogen peroxide and gave a product with low $V_2O_5$ assay. Note particularly the breaking point between runs 3 and 4. In run 3, the $H_2O_2/V_2O_5$ ratio was 0.44 $gH_2O_2/gV_2O_5$ and although a mere 0.06 under the minimal critical ratio, nevertheless resulted in a $V_2O_5$ assay of 0.23% in the product. On the other hand, in run 4, where the $H_2O_2/V_2O_5$ is 0.63 or only 0.13 over the 0.5 $g/gV_2O_5$ the $V_2O_5$ assay dropped to 0.06 or ¼ that of the product of run 3. This break between runs carried out at just below and above the ratio of 0.5 $gH_2O_2/gV_2O_5$ suggests that this is the minimal ratio for solublizing the vanadium impurities.

Table II provides further evidence to show the necessity of maintaining residual or excess hydrogen peroxide at the minimal 0.5 $gH_2O_2/gV_2O_5$ until the uranium peroxide is removed.

Table III demonstrates that the initial pH ($pH_i$) of the uranyl solution is not critical provided the pH is adjusted to the precipitation pH ($pH_p$) subsequent to introducing the hydrogen peroxide. It will be noted that in run 13, where the pH exceeds the $pH_p$ range (phase II) by only 0.2 pH unit, the sodium is at least about 4 times that of the other runs carried out within the $pH_p$ range.

Table IV shows that the precipitation period is not critical to product purity over wide time intervals.

Tables V and VI. These examples show the effects of varying the digestion pH ($pH_d$) and duration of digestion upon product purity and uranium recovery. The data of Table V demonstrate that complete and selective uranium recovery is achieved by carrying out the digestion at a pH ranging between above about 3 to below about 6.

However, note in run 5 of Table V that failure to maintain the requisite excess of hydrogen peroxide resulted in higher $V_2O_5$ in the product. Table VI shows that digestion time does not appear to be critical within the prescribed time limits of the invention, but with increasing time, the residual $H_2O_2$ decreases. After about 180 minutes (Table VI, run 4) the residual $H_2O_2$ decreased to below 0.5 $gH_2O_2/gV_2O_5$. As a result, the vanadium content of the product increases to above 0.1% $V_2O_5$. Product purity can be maintained by adding more peroxide to the solution, but for optimum peroxide utilization, excessive times should be avoided.

Data showing the effects of varying the final pH, ($pH_f$) upon product purity and uranium recovery are also included in Table V. These data suggest that $pH_f$ should be preferably maintained within the pH range of about 4.5 to about 6. Satisfactory results are obtained over the range of 5 – 30 minutes. Longer periods of time are considered neither practical, nor necessary.

TABLE I

Effect of Hydrogen Peroxide Concentration on Product Purity and Uranium Recovery

| Run No. | Initial $gH_2O_2/gU_3O_8$ | Residual $H_2O_2$, g/l | $g/gV_2O_5$ | Barrens, g/l $U_3O_8$ | Product, wt. % $V_2O_5$ | Na |
|---|---|---|---|---|---|---|
| 1 | 0.13 | 0.73 | 0.29 | 0.002 | 0.97 | 0.04 |
| 2 | 0.15 | 0.58 | 0.23 | 0.001 | 1.32 | 0.05 |
| 3 | 0.16 | 1.11 | 0.44 | 0.002 | 0.23 | 0.05 |
| 4 | 0.17 | 1.58 | 0.63 | 0.002 | 0.06 | 0.03 |
| 5 | 0.19 | 1.93 | 0.77 | 0.002 | 0.05 | 0.04 |

Reaction Conditions
Temperature 48° C
$pH_i$ - 5.8
$pH_p$ - 3.5 for 10 min.
$pH_d$ - 5.0 for 50 min.
$pH_f$ - 6.0 for 15 min.
Precipitating Solution
$U_3O_8$ — 70 g/l    Na 16.9 g/l
$V_2O_5$ — 2.5 g/l   $SO_4$ 70 g/l

TABLE II

Effect of Residual Hydrogen Peroxide on Product Purity and Uranium Recovery

| Residual $H_2O_2$ $g/gV_2O_5$ | Barrens, g/l $U_3O_8$ | Product, wt. % $V_2O_5$ | Na |
|---|---|---|---|
| 0.23 | 0.001 | 1.32 | 0.05 |
| 0.29 | 0.002 | 0.97 | 0.04 |
| 0.44 | 0.002 | 0.23 | 0.05 |
| 0.61 | 0.001 | 0.06 | 0.03 |
| 0.63 | 0.002 | 0.07 | 0.05 |
| 0.70 | 0.002 | 0.04 | 0.03 |
| 0.77 | 0.002 | 0.05 | 0.04 |

Reaction Conditions
Temperature 48° C
$pH_i$ - 5.8
$pH_p$ - 3.5 for 10 min.
$pH_d$ - 5.0 for 50 min.
$pH_f$ - 6.0 for 15 min.
Precipitating Solution
$U_3O_8$ — 70 g/l    Na 16.9 g/l
$V_2O_5$ — 2.5 g/l   $SO_4$ 70 g/l

TABLE III

Effect of $pH_i$ $pH_p$ upon Product Purity and Uranium Recovery

| Run No. | $pH_i$ | $pH_p$ | Residual $H_2O_2$ g/l | $g/gV_2O_5$ | Barrens, g/l $U_3O_8$ | Product, wt. % $V_2O_5$ | Na |
|---|---|---|---|---|---|---|---|
| 1 | 4.0 | 2.1 | 0.18 | 0.07 | 0.009 | 2.09 | 0.15 |
| 2 | 5.0 | 2.5 | 1.29 | 0.52 | 0.005 | 0.18 | 0.06 |
| 3 | 5.5 | 2.9 | 1.46 | 0.58 | 0.001 | 0.10 | 0.03 |
| 4 | 5.8 | 3.5 | 1.75 | 0.70 | 0.002 | 0.04 | 0.03 |
| 5 | 5.8 | 3.5 | 1.58 | 0.63 | 0.002 | 0.06 | 0.02 |
| 6 | 5.8 | 3.5 | 1.52 | 0.61 | 0.001 | 0.07 | 0.05 |
| 7 | 5.8 | 3.7 | 1.93 | 0.77 | 0.001 | 0.07 | 0.05 |
| 8 | 4.0 | 3.5[1] | 1.35 | 0.54 | 0.002 | 0.06 | 0.03 |
| 9 | 7.0 | 3.5[1] | 1.64 | 0.66 | 0.004 | 0.08 | 0.04 |
| 10 | 6.0 | 4.9 | 1.81 | 0.72 | 0.004 | 0.04 | 0.03 |
| 11 | 6.0 | 5.0 | 1.70 | 0.68 | 0.045 | 0.03 | 0.07 |
| 12 | 7.0 | 5.2 | 1.81 | 0.72 | 0.543 | 0.10 | 0.02 |
| 13 | 6.2 | 5.3 | 1.58 | 0.63 | 0.099 | 0.10 | 0.69 |
| 14 | 7.0 | 5.2 | 1.99 | 0.80 | 0.296 | 0.06 | 0.06 |
| 15 | 6.0 | 5.1 | 1.99 | 0.80 | 0.026 | 0.98 | 0.15 |
| 16 | 6.2 | 5.2 | 1.99 | 0.80 | 0.108 | 0.07 | 0.09 |

Reaction Conditions
Temperature 48° C
$g/H_2O_2/gU_3O_8$-0.19
$pH_p$ as listed-for 10 min.
$pH_d$-5.0 for 50 min.
$pH_f$-6.0 for 15 min.

Precipitating Solution
$U_3O_8$-70 g/l    Na 16.9 g/l
$V_2O_5$-2.5 g/l   $SO_4$ 70 g/l

[1]pH was adjusted to 3.5 immediately after $H_2O_2$ addition.

TABLE IV

Effect of Time at $pH_p$ upon Product Purity and Uranium Recovery

| Run No. | Precipitation Period min. at ($pH_p$) | Barrens, g/l $U_3O_8$ | Product, wt. % $V_2O_5$ | Product, wt. % Na |
|---|---|---|---|---|
| 1 | 1  | 0.003 | 0.04 | 0.05 |
| 2 | 5  | 0.004 | 0.04 | 0.04 |
| 3 | 20 | 0.002 | 0.07 | 0.03 |

Reaction Conditions
 Temperatures 48° C
 $pH_i$ - 5.8
 $pH_p$ - 3.5 for times listed
 $pH_d$ - 5.0 for 50 min.
 $pH_f$ - 6.0 for 15 min.

Precipitating Solution
 $U_3O_8$ - 70 g/l      Na 16.9 g/l
 $V_2O_5$ - 2.5 g/l     $SO_4$ 70 g/l

TABLE V

Effect of Digestion pH ($pH_d$) and final pH ($pH_f$) on Product Purity and uranium Recovery

| Run No. | $pH_d$ | $pH_f$ | Residual $H_2O_2$, g/l | Residual $H_2O_2$, g/g$V_2O_5$ | Barrens, g/l $U_3O_8$ | Product, wt. % $V_2O_5$ | Product, wt. % Na |
|---|---|---|---|---|---|---|---|
| 1 | 3.0 | 3.0 | 1.26 | 0.50 | 6.3   | 0.48 | 0.03 |
| 2 | 4.0 | 4.0 | 2.22 | 0.89 | 0.02  | 0.11 | 0.01 |
| 3 | 5.0 | 5.0 | 1.87 | 0.75 | 0.005 | 0.07 | 0.02 |
| 4 | 6.0 | 6.0 | 1.87 | 0.75 | 0.06  | 0.04 | 0.03 |
| 5 | 3   | 6.0 | 0.70 | 0.28 | 0.03  | 0.32 | 0.04 |
| 6 | 4   | 6.0 | 1.81 | 0.72 | 0.001 | 0.04 | 0.03 |
| 7 | 5   | 6.0 | 1.58 | 0.63 | 0.002 | 0.06 | 0.02 |

Reaction Conditions
 Temperature 48° C
 $gH_2O_2/gU_3O_8$ - 0.19
 $pH_i$ - 5.8
 $pH_p$ - 3.5 for 10 min.
 $pH_d$ - as listed for 50 min.
 $pH_f$ - as listed for 15 min.

Precipitating Solution
 $U_3O_8$ - 70 g/l      Na 16.9 g/l
 $V_2O_5$ - 2.5 g/l     $SO_4$ 70 g/l

TABLE VI

Effect of Time at $pH_d$ on Product Purity and Uranium Recovery

| Run No. | Time, Min. | Residual $H_2O_2$, g/l | Residual $H_2O_2$, g/g$V_2O_5$ | Barrens, g/l$U_3O_8$ | Product, wt. % $V_2O_5$ | Product, wt. % Na |
|---|---|---|---|---|---|---|
| 1 | 25  | 2.51 | 1.01 | 0.003 | 0.04 | 0.03 |
| 2 | 50  | 1.93 | 0.77 | 0.002 | 0.05 | 0.04 |
| 3 | 90  | 1.64 | 0.66 | 0.001 | 0.05 | 0.03 |
| 4 | 180 | 1.11 | 0.44 | 0.001 | 0.23 | 0.03 |

Reaction Conditions
 Temperature 48° C
 $gH_2O_2/gU_3O_8$ - 0.19
 $pH_i$ - 5.8
 $pH_p$ - 3.5 for 10 min.
 $pH_d$ - 5.0 for times listed
 $pH_f$ - 6.0 for 15 min.

Precipitating Solution
 $U_3O_8$ - 70 g/l      Na 16.9 g/l
 $V_2O_5$ - 2.5 g/l     $SO_4$ 70 g/l

What is claimed is:

1. In the process of recovering uranium values from an aqueous uranyl solution containing dissolved vanadium and sodium including the steps of I, reacting the uranyl solution with hydrogen peroxide at a pH of 2.5 to 5.5 from about 1 to 60 minutes whereby the uranium values are precipitated as uranium peroxide; II, digesting the uranium peroxide at a pH of 3.0 to 7.0 from about 5 to 180 minutes and III, separating the digested uranium peroxide at a pH of 4.0 to 7.0 over a period of about 1 to 60 minutes, the improvement which comprises monitoring the concentration of the hydrogen peroxide in the reaction mixture and therefrom maintaining hydrogen peroxide in excess of at least 0.5 parts per part of vanadium ($V_2O_5$) above the stoichiometric amount required to form the uranium peroxide during steps I to III to suppress coprecipitation of vanadium.

2. The process of claim 1 wherein the pH of the precipitation phase is between 2.9 and 4.9 and the length of the precipitation phase is from about 1 to about 15 minutes; the pH of the digestion phase is between 3.5 and 6.0 and the length of the digestion phase is from about 5 to about 60 minutes; and the pH of the final phase is between 5.0 and 6.0 and the length of the final phase is from about 1 to about 15 minutes.

3. The process of claim 1, in which the aqueous uranyl solution is aqueous uranyl sulfate.

* * * * *

UNITED STATES PATENT OFFICE
CERTIFICATE OF CORRECTION

PATENT NO. : 4,024,215
DATED : May 17, 1977
INVENTOR(S) : Frank E. Caropreso and Donald F. Kreuz It is certified that error appears in the above-identified patent and that said Letters Patent are hereby corrected as shown below:

Column 1, line 19, "acidleach" should read -- acid leach--,

Column 5, line 17, "Runs -3" should read --Runs 1-3--,

Column 6, Table II, "8/1 $U_8O_8$" should read --8/1 $U_3O_8$--,

Column 6, line 46, Table III, "pHi php" should read --pHi and pHp--, Column 7, line 20, Table IV "$U_3O_H$" should read --$U_3O_8$--.

Signed and Sealed this

Sixth Day of September 197

[SEAL]

Attest:

RUTH C. MASON
Attesting Officer

LUTRELLE F. PARKER
Acting Commissioner of Patents and Trademark